UNITED STATES PATENT OFFICE.

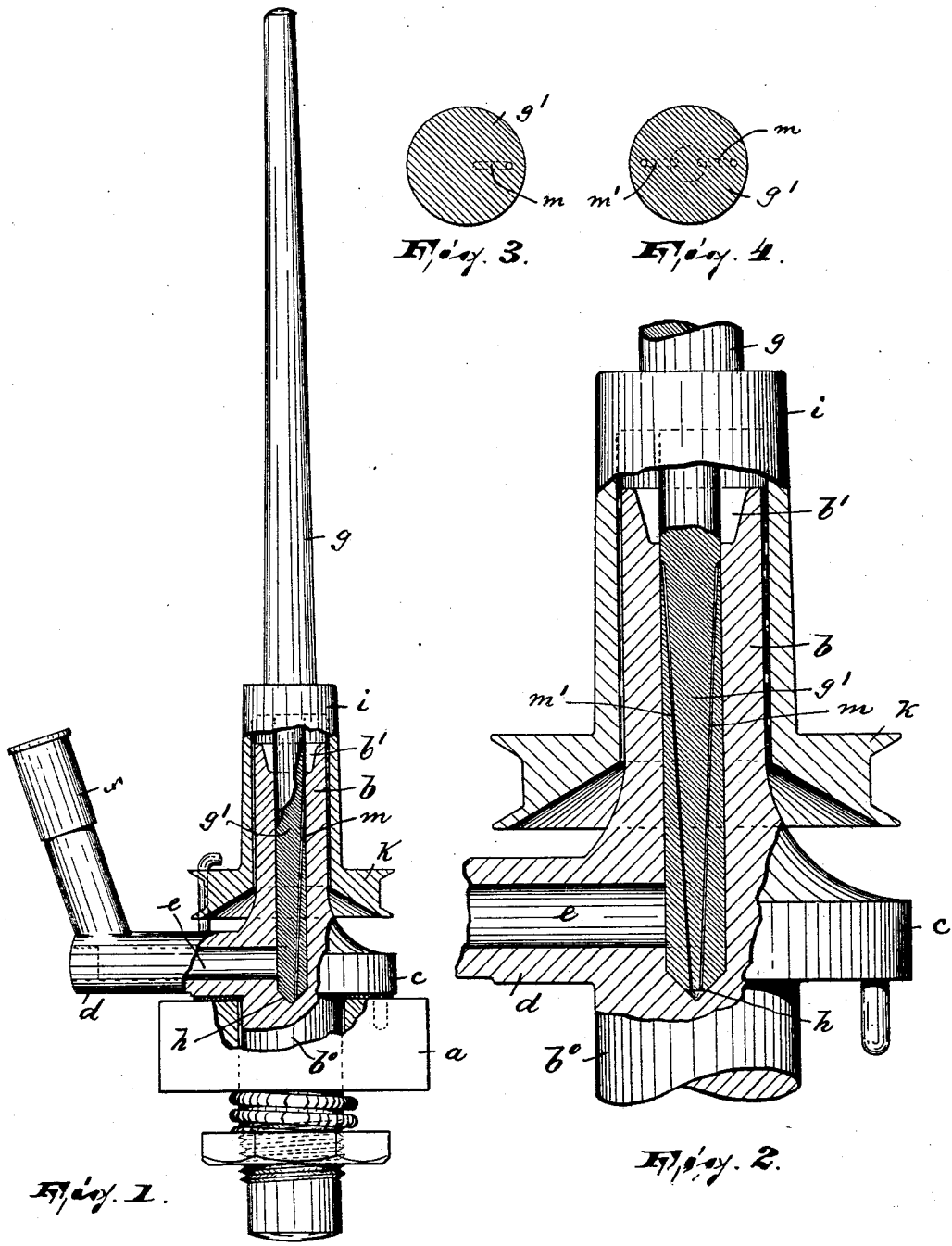

ALFRED GARTNER, OF PATERSON, NEW JERSEY, ASSIGNOR TO THE DRAPER COMPANY, OF PORTLAND, MAINE.

LUBRICATING DEVICE FOR SPINNING-SPINDLES.

SPECIFICATION forming part of Letters Patent No. 580,108, dated April 6, 1897.

Application filed January 27, 1897. Serial No. 620,878. (No model.)

*To all whom it may concern:*

Be it known that I, ALFRED GARTNER, a citizen of the United States, residing in Paterson, county of Passaic, and State of New Jersey, have invented certain new and useful Improvements in Lubricating Devices for Spinning-Spindles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to lubricating devices, and is especially applicable to spinning-spindles and in general to any vertically-arranged shaft adapted to be revolved at high speed and having a long or deep bearing.

The object of the invention is to provide a spinning-spindle with a lubricating device by means of which the entire bearing-surface of the said spindle and its bearing is subjected to a continuous flow and circulation of the lubricant. The bearing is thus kept thoroughly and uniformly lubricated with a comparatively small quantity of lubricant, and the latter is not allowed to accumulate in the lowermost portion of the bearing and get thick and sticky.

The invention consists in the arrangement of a channel or channels connecting the lowermost and uppermost portions of the bearing for a spindle and formed in the said spindle and at an acute angle or angles to the center line thereof, substantially as will be hereinafter more fully described, and finally embodied in the clauses of the claim.

In the accompanying drawings, Figure 1 is a side elevation of a spinning-spindle provided with my improvements, certain portions being broken away and others shown in section to better illustrate the nature of the said invention; Fig. 2, an enlarged detail view of certain portions of Fig. 1 and embodying slight modifications; Fig. 3, an enlarged cross-sectional view through the lower portion of the spindle as illustrated in Fig. 1, and Fig. 4 a cross-sectional view through the lower portion of the spindle as illustrated in Fig. 2.

In said drawings, $a$ represents a spindle-rail in which is mounted the tube $b^0$, having the annular flange $c$ and provided in the upwardly-projecting portion $b$ thereof with step and bolster bearing for the reduced portion $g'$ of the spindle $g$, the latter being provided with the sleeve $i$ and the whirl $k$, through which motion is imparted to the said spindle. Projecting from the annular flange $c$ is the oil-cup $d$, with cap $f$, and communicating with the step-bearing $h$ of the spindle by means of the channel $e$.

In the upper end of the upwardly-projecting portion $b$ is arranged an annular chamber $b'$, communicating with the step-bearing through the channel $m$, as in Fig. 1, which latter is arranged at an acute angle to the center line of the spindle. In Fig. 2 two channels $m$ and $m'$ are arranged in the reduced portion $g'$ of the spindle at acute angles to the center line thereof and extending from the step-bearing $h$ to about the annular chamber $b'$, as clearly shown.

In operation the lubricant, which is supplied through the oil-cup $d$, enters the step-bearing $h$ of the spindle, and, as the latter is revolved at high speed, is by action of centrifugal force drawn into the channel $m$, (or $m$ and $m'$,) carried upward, and discharged through the outlet-openings of said channels. By the action of gravity it is carried downward toward the step-bearing $h$ and during its travel thoroughly and uniformly lubricates the entire bearing-surface.

From the foregoing it can be seen that a complete and continuous circulation of the lubricant is obtained with a comparatively small quantity of lubricant and that the lubricating is accomplished in a thorough and reliable manner, thus rendering the spindle more durable and easier to be operated.

Having thus described my invention, what I claim as new, and desire to secure by Letters Patent, is—

1. A spindle provided within its bearing portion with a channel arranged at an acute angle to the center line of said spindle, substantially as described.

2. A spindle provided within its bearing portion with a channel arranged at an acute angle to the center line of said spindle, and beginning at about its lowermost portion, substantially as described.

3. A spindle provided within its bearing portion with a channel arranged at an acute angle to the center line of said spindle and extending from about the lower end to the upper end of said bearing portion, substantially as and for the purposes described.

4. A spindle having a series of channels arranged within its bearing portion and at acute angles to the center line thereof, substantially as and for the purposes described.

5. A spindle provided within its bearing portion with channels adapted to carry a lubricant, said channels extending upward from the lower portion of the spindle and diverging outwardly, whereby the lubricant is raised in said channels by the centrifugal force during the rotation of the spindle.

6. A tube containing step and bolster bearing, combined with a spindle mounted in said tube and provided within its bearing portion with a channel arranged at an acute angle to the center line thereof.

7. A tube containing step and bolster bearing, combined with a spindle, mounted in said tube and provided within its bearing portion with a channel, arranged at an acute angle to the center line thereof, said channel being of a length about equal to the depth of the bolster-bearing, substantially as and for the purposes described.

8. A tube containing step and bolster bearing and provided in its upper portion with an annular chamber, combined with a spindle, mounted in said tube and provided with a channel extending through the spindle at an acute angle to the center line of the same and extending from about the step-bearing to or near the annular chamber, substantially as and for the purposes described.

In testimony that I claim the foregoing I have hereunto set my hand this 23d day of January, 1897.

ALFRED GARTNER.

Witnesses:
WM. D. BELL,
DUNCAN M. ROBERTSON.